United States Patent [19]
Letovsky

[11] Patent Number: 5,885,080
[45] Date of Patent: Mar. 23, 1999

[54] MECHANICALLY ACTUATED MOTION PLATFORM

[76] Inventor: Howard Letovsky, P.O. Box 1925, Willits, Calif. 95490

[21] Appl. No.: 987,874

[22] Filed: Dec. 10, 1997

[51] Int. Cl.$^6$ .................................................. G09B 9/04
[52] U.S. Cl. ............................... 434/62; 434/29; 434/30; 434/67
[58] Field of Search .................................. 434/62, 67, 70, 434/46, 29, 55, 30; 280/279; 472/59, 60, 130

[56] References Cited

U.S. PATENT DOCUMENTS

| | | | |
|---|---|---|---|
| 3,479,750 | 11/1969 | Swanson | 434/62 |
| 4,276,030 | 6/1981 | Radice | 434/62 |
| 4,887,967 | 12/1989 | Letovsky | 434/61 |
| 5,346,398 | 9/1994 | Nakahata et al. | 434/67 |
| 5,415,550 | 5/1995 | Aoki et al. | 434/29 |
| 5,553,879 | 9/1996 | Niemeyer et al. | 280/279 |

FOREIGN PATENT DOCUMENTS

1663617-A1   7/1991   U.S.S.R. .................................. 434/30

*Primary Examiner*—Robert A. Hafer
*Assistant Examiner*—Bena B. Miller

[57] ABSTRACT

A mechanically actuated motion platform which provides a realistic simulation of the side to side motion experienced while operating a vehicle which is normally steered at its front end. The motion platform is comprised of a base frame coupled through a pivot to a second frame which carries a steering assembly and a operator seat. The steering assembly is coupled though a means for conveying rotational energy to an axle shaft which uses a traction wheel fixedly connected to the axle shaft to effect substantially horizontal movement of the second frame when rotational force is applied to the steering shaft. Also provided is a tiltable operator seat which acts in concert with a spring loaded throttle pedal to impart sensations of acceleration and deceleration to the user.

9 Claims, 2 Drawing Sheets

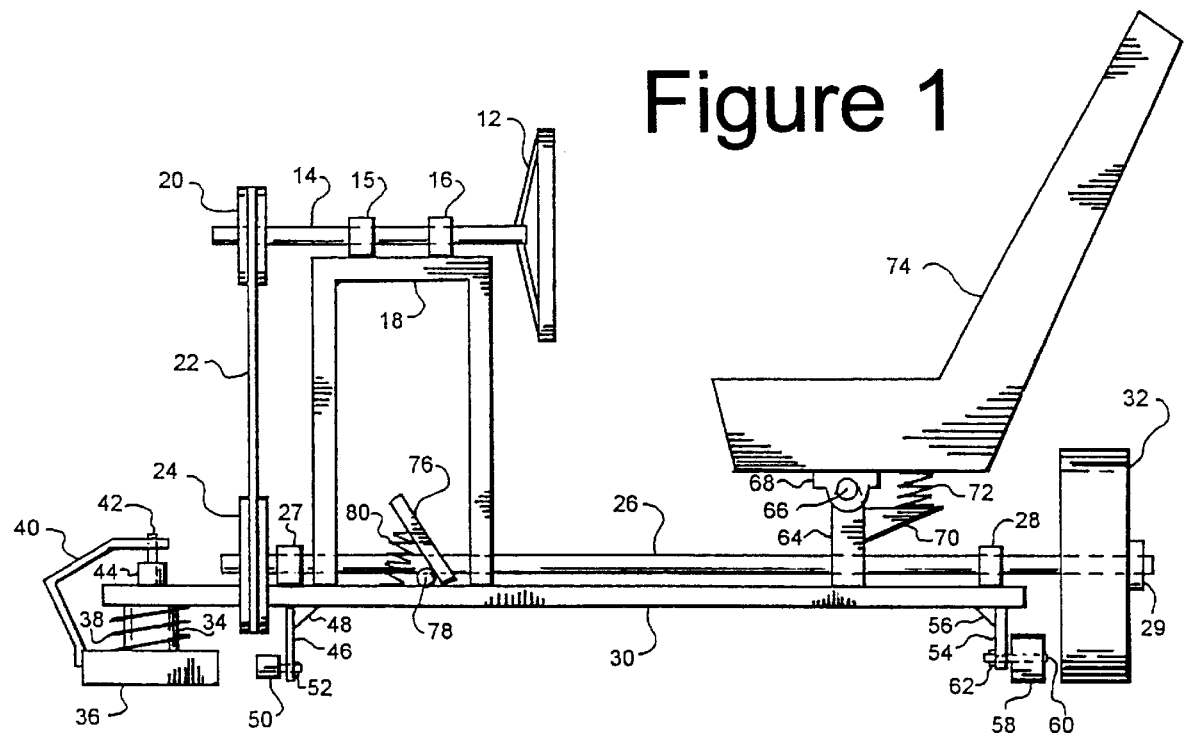
Figure 1
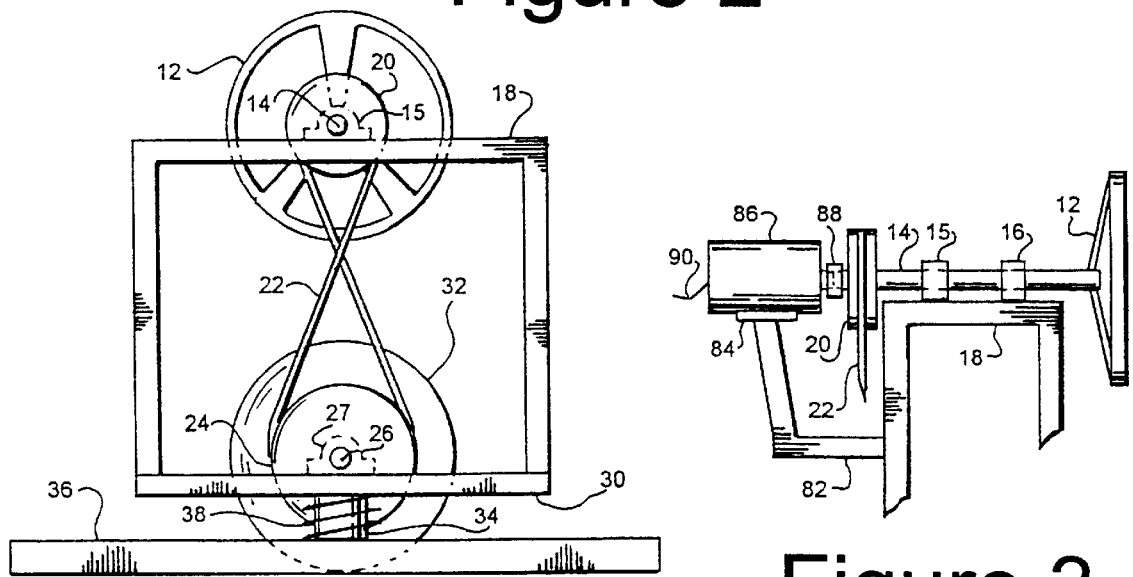
Figure 2
Figure 3

MECHANICALLY ACTUATED MOTION PLATFORM

BACKGROUND—FIELD OF INVENTION

This invention relates generally to mechanisms which are normally used to provide occupant motion in simulated land surface or water vehicles normally steered at the front end. More specifically, the present invention relates to such simulated vehicles used for training or amusement purposes in conjunction with visual displays.

BACKGROUND—DESCRIPTION OF PRIOR ART

Simulated vehicle motion platforms have been used for decades to train all manner of vehicle operators in safe, repeatable, and observable conditions. Motion platforms are being used more extensively than ever before in the amusement industry to add realism to film, video, and computer generated visual entertainment experiences. Most simulated vehicles are complex devices which utilize motors, air compressors, or hydraulic systems to provide motion in one or more axes. Systems which use the aforementioned elements require specialized electronic circuitry and computer programming to effectively adapt the response of the motion platform to different visual media. These systems are generally expensive to produce and require a high level of technical expertise to maintain.

My own U.S. Pat. No. 4,887,967, describes a sophisticated vehicle simulator, which, although effective for its proposed purpose, does not meet the needs intended to be satisfied by the current invention disclosed herein. U.S. Pat. No. 4,582,490 discloses a vehicle simulator using a motorized drum to effect the side to side motion typical of a front end steering, surface traversing vehicle such as an automobile. The steering mechanism triggers an electrical impulse to activate a hydraulic, pneumatic, or electrical actuator which in turn drives the operator platform one way or the other. The onset forces provided by these types of mechanisms do not accurately simulate the sensations experienced by an operator of a direct coupled mechanically steered vehicle. U.S. Pat. No. 4,276,030 discloses a mechanical "Pivotable Vehicle Simulator" which preceded many powered motion platforms. This mechanically operated device used a combination of cables and pulleys to move a user platform about a vertical axis. An upward translation effect and a spring were employed to overcome inertial energy and the lack of mechanical advantage of the drive system and provide additional energy to return the user to a center position.

None of the aforementioned devices accurately imparts to the user the sensations of operating a vehicle manually steered at its front end. Under normal conditions, when one operates such a vehicle, manual effort is used to aim the front end in the desired direction of travel. The rear of the vehicle, including that portion of the passenger compartment in which the operator is seated, smoothly swings in the opposite direction to that which the steering wheel is turned, with a subtle yet noticeable G-force imparted to the driver. The harder the operator turns the wheel, the more dramatic the G-force effect. The swing of the passenger compartment is always in direct relationship to the swing of the wheel since the gear ratio of the steering mechanism is fixed. Furthermore, if a translation component were to be introduced into the experience, as in U.S. Pat. No. 4,276,030, it should be a slight downward translation, not upward, to simulate the compressing of the vehicle suspension due to added inertial and gravitational forces.

As the volume and quality of film and computer generated visual product has increased, it has become necessary to create a motion platform which can be easily interfaced to any visual display system, provide realistic physical response effects to the user, be safe and durable in wide public use, be operable intuitively, and be cost effective.

OBJECTS AND ADVANTAGES OF THE PRESENT INVENTION

The object of the present invention is to provide a realistic simulation of the exemplary sensations experienced while operating a vehicle steered at its front end. This simulation is made possible by utilizing a manually actuated motion base which is capable of side to side movement and a tiltable seat working in conjunction with spring loaded throttle pedal which imparts to the operator the sensations of acceleration and deceleration.

Another object of the invention is to provide a motion platform which can be operated manually by a wide range of users with very little effort. In the preferred embodiment of the present invention, a seat and a steering assembly are mounted to an operator support platform which is carried by a low friction front pivot and supported at the rear with a high durometer traction wheel and two idler wheels. This arrangement insures that the overall coefficient of friction of the user carriage is extremely small and eliminates the need to offset inertia with a complex spring system. The drive axle of the traction wheel is coupled to steering assembly through a continuous drive belt configured in a figure eight arrangement. The distance of the traction wheel from the front pivot creates a large mechanical advantage of the steering force input. Turning the steering mechanism in any direction causes the axle shaft to turn in the opposite direction, thereby causing the rear of the user platform to move in the opposite direction of the rotation of the steering wheel in a horizontal plane about the front pivot. This motion accurately simulates the side to side motion of a front end steered vehicle.

Another object of the invention is to provide automatic centering of the operator platform when not in use. Since so little force is required to move the operator platform, a small coil spring mounted between the upper frame and the base frame will urge the operator platform back to the center position when the platform is empty.

Another object of the invention is to allow synchronized interaction between the movements of the motion platform and visual displays. A foot pedal position sensor provides acceleration and deceleration information and a front pivot mounted position sensor provides horizontal position information. These outputs can be wired to interact with any visual display system.

The advantages of the present invention over the prior art include realistic simulation of multiple sensory effects, ease of use by a broad range of operators, universal interface with different visual display systems, low production and assembly costs, and minimal maintenance.

The above described advantages and many other features and attended advantages of the present invention will become better understood by reference to the following detailed description when taken in conjunction with the drawings.

BRIEF DESCRIPTION OF THE DRAWINGS

FIG. 1 is a side elevation view showing a preferred exemplary motion platform in accordance with the present invention.

FIG. 2 is a partial front view detailing the sheaves and belt drive specified in the preferred embodiment of the invention.

FIG. 3 is a side elevation view of an electrically operated force feedback mechanism coupled to the forward end of the steering shaft.

DESCRIPTION OF THE PRESENT INVENTION

Figure 5:
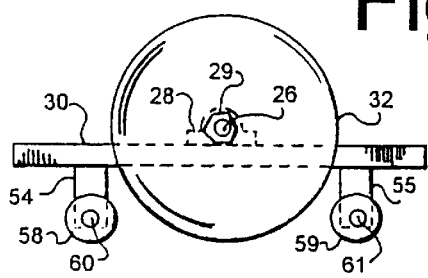
FIG. 5 is a partial rear view detailing the idler wheel placement in the preferred embodiment of the invention.

The preferred embodiment of the motion platform in accordance with the present invention as detailed in FIG. 1 and partially detailed FIGS. 2 and 5, includes a base frame 30 which rests on any suitable structural support or floor surface. A front pivot assembly 34 is attached to the base frame and supports the forward end of an operator support platform. The operator support platform 30 is fitted with an operator seat 74 mounted towards the rear and has a steering assembly support tower 18 mounted directly behind the front pivot assembly 34.

A steering wheel 12 of at least twelve inches in diameter is fixedly mounted to the rearward end of a one inch diameter steel steering shaft 14 twenty inches long. The steering shaft 14 is set into standard self aligning base mount type pillow block bearing assemblies 15 and 16.

A standard three and a half inch diameter v-belt sheave 20 is fixedly mounted onto the forward end of the steering shaft 14.

The pillow blocks 15 and 16 carrying the steering shaft 14 are bolted to the top surface of the twenty four inch high by twenty four inch wide by ten inch deep rigid steering assembly support frame 18 fabricated from steel tubing, formed steel, formed plastic, or hardwood. The steering assembly support frame 18 is fabricated to form a open inverted "EU" shape so that the operator's legs can extend underneath the mounting of the steering assembly to access the foot pedal 76.

The bottom of the steering assembly support frame 18 is rigidly attached with bolts or welds (not shown) to the top surface of a twenty four inch wide by forty eight inch long by two inch thick operator support frame 30 which is also fabricated from steel tubing, formed steel, formed plastic, or hardwood. The steering assembly support frame 18 is mounted twelve inches back from the forward end of the operator support platform 30.

A one inch diameter by forty-four inch long axle shaft 26 is set into a pair of self aligning base mount type pillow block bearing assemblies 27 and 28 which are located and secured within four inches of either end of the axle shaft 26. The forward pillow block 27 is located and bolted centrally twelve inches behind the forward end and on the top surface of the operator support platform 30.

The rear pillow block 28 is located and bolted centrally at the rearward edge of the top surface of operator support platform 30. A standard seven inch diameter v-belt sheave 24 is mounted fixedly on the front end of the axle shaft 26 such that the lower half of the sheave 24 can extend downward through a clearance hole in the operator support platform 30.

A standard continuous v-belt 22 is mounted in a figure eight arrangement as shown in FIG. 2 coupling sheave 20 and sheave 24 so that any rotary motion of steering shaft 14 will induce an opposing rotary motion in axle shaft 26.

Secured to the lower surface of the operator support platform 30 at the forward edge is the top surface of a standard pivot assembly 34 (shown in gross view) which can be a lazy susan type roller bearing, a dual tapered roller bearing, a Teflon bearing with steel shaft, or any other suitable pivot assembly available. The bottom surface of the pivot assembly 34 is secured to the top surface of a six inch wide by thirty six inch long by two inch thick base frame 36 which is fabricated from steel tubing, formed steel, formed plastic, or hardwood. The base frame 36 is intended to rest on the floor surface with its length perpendicular to the neutral position of the operator support frame 30.

A traction wheel 32 of similar diameter to the steering wheel 12 is fixedly secured to the rearward end of the axle shaft 26 with lock nut 29 so that the traction wheel 32 can rest on the floor surface which supports the entire mechanism (floor surface not shown). The traction wheel 32 is ideally made from a high durometer rubber or urethane compound and located approximately four feet away from the front pivot point.

Since the traction wheel is ideally the same size as the steering wheel and the sheaves 20 and 24 are selected to provide a gear reduction from the steering shaft to the axle shaft, a 360 degree turn of the steering wheel 12 will result in approximately a 30 degree swing of the operator support platform 30, which is effectively a 12 to 1 gear reduction.

A coil spring 38 is mounted around the outer surface of the pivot assembly 34 so that the top arm of the coil 38 is rigidly affixed to the underside of the operator support platform 30 and the lower arm of the coil 38 is rigidly affixed to the top surface of the base frame 36.

A bracket 40 is mounted centrally on the front surface of the base frame 36 and extending upward to fixedly secure the moveable element 42 of electrical sensor 44 so that the nonmoveable base of electrical sensor 44 can be fixedly secured to the top surface of the operator support platform 30 in a position directly above the exact center of the pivot assembly 34.

The top edge of a two inch wide by four inch high by quarter inch thick steel bracket 46 is rigidly affixed perpendicularly to the underside of the operator support frame 30 directly below the mounting position of pillow block 27. The attachment of bracket 46 is strengthened by triangular gusset 48 rigidly affixed centrally to the underside of the operator support frame 30 and the vertical rearward face of mounting bracket 46. The imbedded steel shaft of a standard rubber stop 50 is mounted through a clearance hole located centrally one half inch above the bottom edge of bracket 46 and secured with lock nut 52.

The lower edge of throttle pedal 76 is fixedly attached to the top surface of operator support platform 30 with a typical hinge type pivot 78. Pivot 78 can also contain a standard integrated electrical position sensor (not shown). Throttle pedal spring 80 is mounted fixedly to the central underside surface of throttle pedal 76 and the top surface of operator support platform 30.

Figure 4:
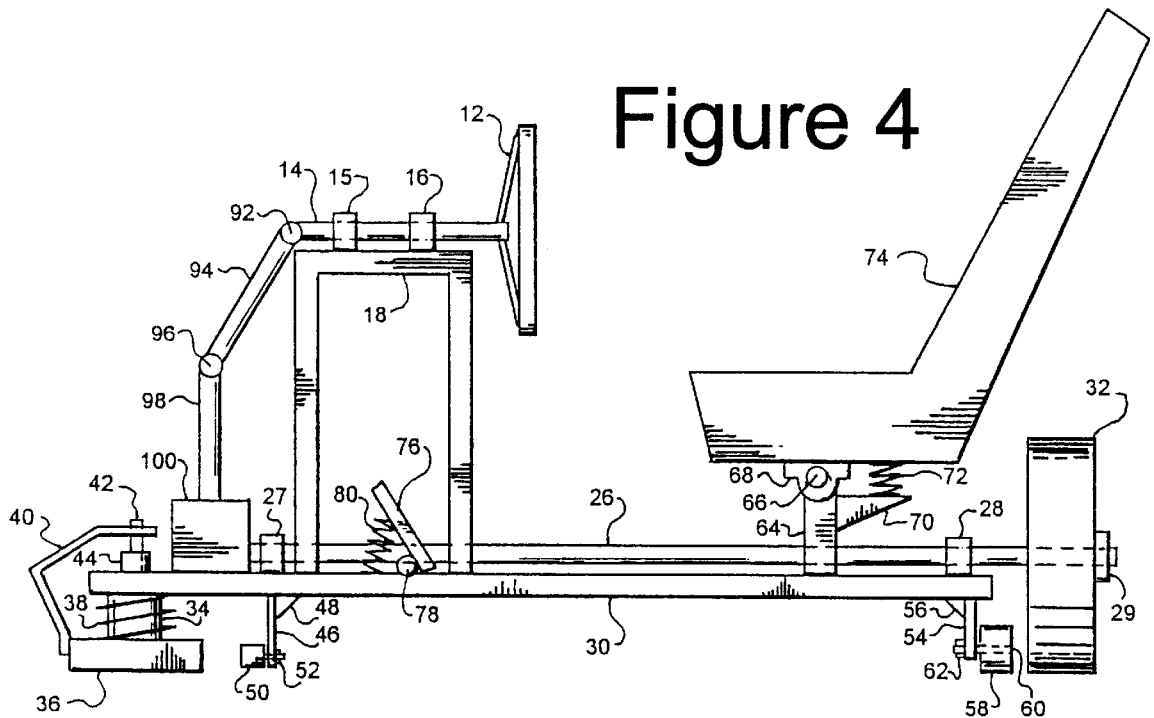
FIG. 4 is a side elevation view showing an additional embodiment of the invention wherein shafts, universal joints, and a gear set are used in place of the sheaves and drive belt.

The top edges of two three inch wide by four inch high by quarter inch thick steel brackets 54 and 55 as shown in FIG. 5 are rigidly affixed perpendicularly to the underside of the outside rear edges of operator support frame 30. The attachment of both brackets 54 and 55 are strengthened by the use of a triangular gusset 56 as shown in FIG. 1 and FIG. 4. Half inch diameter by three inch long steel axle shafts 60 and 61 are mounted through a clearance hole bored centrally one half inch above the bottom edge of bracket 54 and bracket 55 and secured as shown in FIGS. 1 and 4 with a lock nut 52.

Idler wheels 58 and 59 as shown in FIG. 5 are mounted to freely rotate on axles 60 and 61 in axes parallel to the axis of axle shaft 26 in contact with the floor surface supporting traction wheel 32. The idlers 58 and 59 maintain the operator support platform 30 absolutely parallel to the base frame 36 so that changes in direction are smooth and require negligible additional effort than initiating movement from a standstill.

A two inch square by ten inch tall rigid seat pivot support tower 64 as shown in FIGS. 1 and 4 is fixedly attached at its bottom surface to the top surface of operator platform 30 ten inches forward of the rear edge of operator support platform 30. Seat pivot support tower 64 is mounted adjacent to axle shaft 26 to allow free rotation of axle shaft 26 along the central longitudinal axis of operator support platform 30. A four inch long by one inch diameter steel seat pivot shaft 66 is fixedly mounted to the top surface of seat pivot support tower 64 perpendicular to the central longitudinal axis of operator support platform 30. Two inches of the length of seat pivot shaft 66 will extend beyond the edge of seat pivot support tower 64 to allow mounting of a base mount type pillow block 68 so that pillow block 68 can freely rotate about seat pivot shaft 66.

The base of pillow block 68 is fixedly attached to the midpoint of the underside of seat 74. As shown in FIGS. 1 and 4, a rigid four inch long triangular spring support 70 is fixedly attached at its wide edge to seat pivot support tower 64 just below the attachment point of seat pivot shaft 66. Seat support spring 72 is mounted fixedly to the underside surface of seat 74 and the top surface of spring support 70.

An additional embodiment of the invention as shown in FIG. 3 shows a side view of a force feed back mechanism used to provide additional sensory effects to the operator. An electrically operated clutch or electric motor 86 (shown in gross view) is attached with a standard shaft coupler 88 to the forward end of the steering shaft 14 to apply a force to effect the rotational action of the steering wheel 12 with electrical signals received through wire harness 90 from a computer system operating in concert with a visual display system.

An additional embodiment of the invention as shown in FIG. 4 is a side view of the mechanism with a configuration that provides essentially the same actions and effects as the preferred embodiment shown in FIG. 1. In this embodiment, a standard universal joint 92 (shown in gross view) is fixedly attached to the forward end of steering shaft 14 to couple steering shaft 14 to and allow offset axial movement of a one inch diameter by 12 inch long extension shaft 94. Another standard universal joint 96 is fixedly attached to the lower end of extension shaft 94 to couple extension shaft 94 to and allow offset axial movement of the one inch diameter input shaft 98 of standard right angle drive gearbox 100 (shown in gross view). The bottom surface of gearbox 100 is fixedly attached five inches behind the forward edge and to the upper surface of operator platform 30. Axle shaft 26 serves as the output shaft of gearbox 100 in this configuration.

Figure 6:
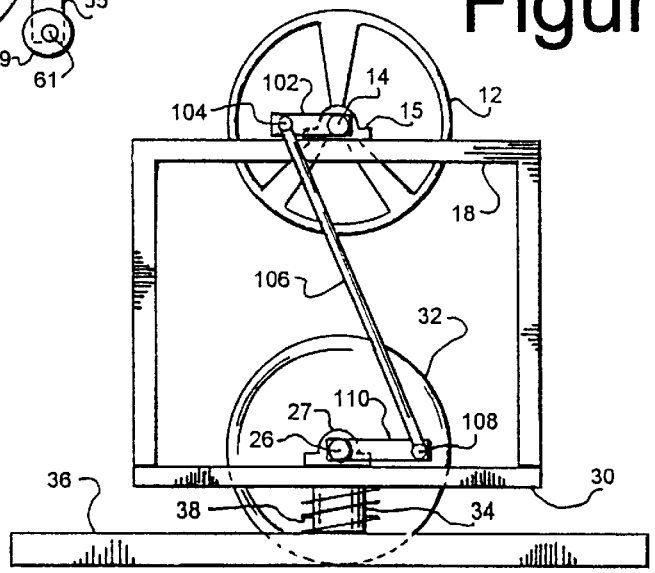
FIG. 6 is a partial front view of the mechanism wherein linkage arms and an actuating rod assembly are used in place of the sheaves and drive belts.

An additional embodiment of the invention as shown in FIG. 6 is a front view of the mechanism where the sheaves 20 and 24 are replaced with linkage arms and a linkage rod to provide a shorter range of motion for the steering assembly. A five inch long upper linkage arm 102 is fixedly mounted at one end to the forward end of steering shaft 14 and the outer end is fixedly attached to the freely rotating element of a standard rod end 104. The threaded end of rod end 104 is fixedly attached to the upper end of drive rod 106. The other lower end of drive rod 106 is fixedly attached to the threaded end of rod end 108, the freely rotating end of which is mounted to the outer end of lower linkage arm 110 which replaces lower sheave 24. Since the drive rod 106 crosses both vertical diameters of steering shaft 14 and axle shaft 26, the direction of rotation of axle shaft 26 is always opposite to the direction of rotation of the steering shaft 12.

OPERATION OF THE INVENTION

The preferred use of the embodiment of the invention as shown in FIG. 1 would require an operator to sit in seat 74 and, in response to visual and/or auditory information introduced externally, manually apply rotational force in either direction to steering wheel 12. The steering shaft 14, supported by bearings 15 and 16 mounted to support tower 18, will translate rotary motion through sheave 20 into drive belt 22. Drive belt 22 is twisted into a figure eight pattern, as shown in FIG. 2, to induce an opposing direction of rotation from the steering shaft into sheave 24 which serves as the lower carrier and guide for the drive belt 22.

Drive belt 22 can be a continuous v-belt, cog belt, or any other continuous length of flexible material designed to grip a guide surface with minimal slip and retain its shape and length under torque. The lower sheave 24 is intended to be larger than the upper sheave 20 to increase the mechanical advantage applied to the steering wheel 12 by the operator. Sheave 24 is mounted to live axle 26 which is retained and allowed to freely rotate within bearings 27 and 28 which are mounted to support platform 30. The rearward end of the live axle 26 is fitted with a traction wheel 32. The forward end of support platform 30 is affixed to a pivot 34 which allows platform 30 to freely rotate about base frame 36 in a substantially horizontal plane.

Traction wheel 32 is intended to rest on the same floor surface where the base frame 36 is supported and at some distance from the pivot 34 to further increase the mechanical advantage of the rotary force applied to the steering wheel to move the operator in seat 74 together with the support platform 30 in the opposing direction of rotation to the direction the steering wheel is turned. Sensor mounting bracket 40 is fitted with a moveable element 42 of an electrical sensor 44 and the body of sensor 44 is mounted to support platform 30. This configuration is used to provide electrical position information of the operator support platform 30 to a visual display system.

A coil spring 38 is used to automatically return operator support platform 30 to a neutral position when not in use, and rubber stop 50 limits the travel. A foot actuated throttle pedal 76 is provided to send electrical signals relating to the position of the operator's foot to a computer or other visual display such that the visual display is effected by the movement of the pedal.

The throttle pedal 76 is also fitted with a stiff spring 80 which works in concert with the tilting seat 74 to provide additional operator sensory effects. When the operator rapidly depresses the throttle pedal 76 in response to a visual display cue, the spring 80 provides enough resistance to overcome the supporting pressure of the weaker spring 72 mounted under seat 74, causing seat 74 to tilt backward slightly, giving the operator a sensation of forward acceleration. When the operator rapidly relaxes pressure on throttle pedal 76, as in braking, the seat 74 returns to its neutral position providing the operator with a sensation of deceleration.

The invention, when used as described herein, provides an operator a realistic simulation of the exemplary sensations experienced while operating a vehicle manually steered at its front end.

The preferred use of the enhancement to the invention as shown in FIG. 3 would require an electrical signal to be introduced into the motor or clutch 86 from an external source in conjunction with an external visual display to cause the steering wheel 12 to provide complementary sensory feedback to the operator. The visual display apparatus can be any computer, film, or video hardware or software system capable of receiving operator inputs to compute and apply the visual display parameters.

The preferred use of the invention as shown in FIG. 4 would be exactly the same as described above for FIG. 1 except that the rotational force applied to the steering wheel 12 is transferred to the axle shaft 26 through universal joints 92 and 96, extension shaft 94, and gearbox 100. The motion of the operator support platform 30 and the tilting seat 74 are exactly the same as the mechanism in FIG. 1.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is limited only by the following claims.

What is claimed is:

1. A mechanically actuated motion platform comprising, in combination:

a base frame;

a second frame including a steering means coupled to a steering shaft journalled on said second frame and connected to be rotated by said steering means;

a pivot means coupling said base frame to said second frame to allow movement of said second frame relative to said base frame in a substantially horizontal plane about a vertical axis;

an axle shaft journalled on said second frame and mounted substantially parallel to said steering shaft;

a means for conveying rotational energy from said steering shaft to said axle shaft which includes sheaves coupled with a continuous drive belt in a figure eight arrangement so that the axle shaft will rotate in the opposite direction of the steering shaft when rotational force is applied to the steering means;

a traction wheel fixedly connected to said axle shaft to provide support for the rearward end of the second frame and effect substantially horizontal movement of said second frame when rotational force is applied to said steering shaft.

2. A mechanically actuated motion platform according to claim 1 which includes at least one freely rotatable idler wheel mounted at the rear of the second fame offset from the traction wheel, but parallel to said traction wheel to further support said second frame;

at least one stop mounted to the second frame such that said stop may contact a point on the base frame to limit the amount of travel of the second fame relative to the base frame;

at least one sensor means to interface with any visual display means;

at least one sensor means to interface with any auditory display means;

a means to impart counteracting forces to any of the movable elements within said motion platform;

a means to automatically center the second frame relative to the base frame.

3. A mechanically actuated motion platform according to claim 1 which includes a tilting seat means to simulate the sensations of acceleration and deceleration.

4. A mechanically actuated motion platform comprising, in combination:

a base frame;

a second frame including a steering means coupled to a steering shaft journalled on said second frame and connected to be rotated by said steering means;

a pivot means coupling said base frame to said second frame to allow movement of said second frame relative to said base frame in a substantially horizontal plane about a vertical axis;

an axle shaft journalled on said second frame and mounted substantially parallel to said steering shaft;

a means for conveying rotational energy from said steering shaft to said axle shaft which includes a gear set mounted to the second frame to couple the steering shaft to the axle shaft so that the axle shaft will rotate in the opposite direction of the steering shaft when rotational force is applied to the steering means;

a traction wheel fixedly connected to said axle shaft to provide support for the rearward end of the second frame and effect substantially horizontal movement of said second frame when rotational force is applied to said steering shaft.

5. A mechanically actuated motion platform according to claim 4 which includes at least one freely rotatable idler wheel mounted at the rear of the second frame offset from the traction wheel, but parallel to said traction wheel to further support said second frame;

at least one stop mounted to the second frame such that said stop may contact a point on the base frame to limit the amount of travel of the second frame relative to the base frame;

at least one sensor means to interface with any visual display means;

at least one sensor means to interface with any auditory display means;

a means to impart counteracting forces to any of the movable elements within said motion platform;

a means to automatically center the second frame relative to the base frame.

6. A mechanically actuated motion platform according to claim 4 which includes a tilting seat means to simulate the sensations of acceleration and deceleration.

7. A mechanically actuated motion platform comprising, in combination:

a base frame;

a second frame including a steering means coupled to a steering shaft journalled on said second frame and connected to be rotated by said steering means;

a pivot means coupling said base frame to said second frame to allow movement of said second frame relative to said base frame in a substantially horizontal plane about a vertical axis;

an axle shaft journalled on said second frame and mounted substantially parallel to said steering shaft;

a means for conveying rotational energy from said steering shaft to said axle shaft which includes a linkage means to couple the steering shaft to the axle shaft so that the axle shaft will rotate in the opposite direction of the steering shaft when rotational force is applied to the steering means;

a traction wheel fixedly connected to said axle shaft to provide support for the rearward end of the second frame and effect substantially horizontal movement of said second frame when rotational force is applied to said steering shaft.

8. A mechanically actuated motion platform according to claim 7 which includes at least one freely rotatable idler wheel mounted at the rear of the second frame offset from the traction wheel, but parallel to said traction wheel to further support said second frame;

at least one stop mounted to the second frame such that said stop may contact a point on the base frame to limit the amount of travel of the second frame relative to the base frame;

at least one sensor means to interface with any visual display means;

at least one sensor means to interface with any auditory display means;

a means to impart counteracting forces to any of the movable elements within said motion platform;

a means to automatically center the second frame relative to the base frame.

9. A mechanically actuated motion platform according to claim 7 which includes a tilting seat means to simulate the sensations of acceleration and deceleration.

\* \* \* \* \*